Sept. 6, 1932.    J. D. TUCKER ET AL    1,876,265
VEHICLE BRAKE
Filed Oct. 3, 1930    2 Sheets-Sheet 1

INVENTORS
J. D. Tucker and O. A. Tucker
BY
ATTORNEY

Sept. 6, 1932.  J. D. TUCKER ET AL  1,876,265
VEHICLE BRAKE
Filed Oct. 3, 1930   2 Sheets-Sheet 2
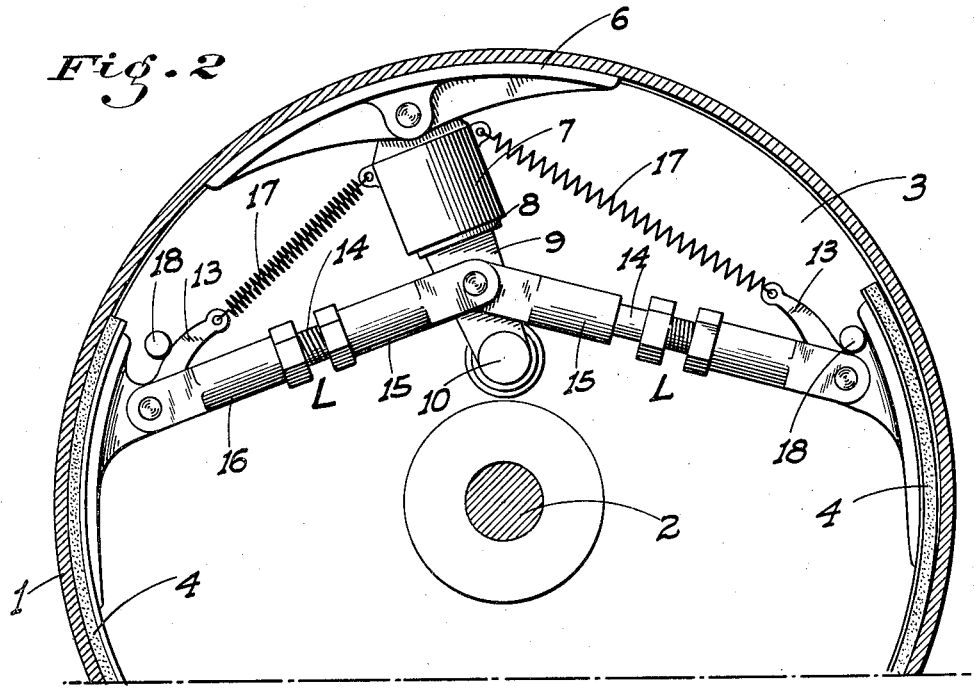
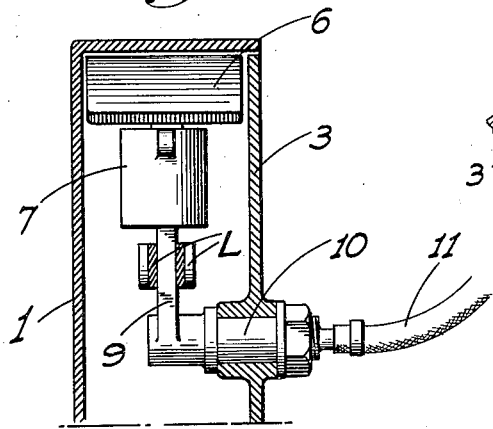
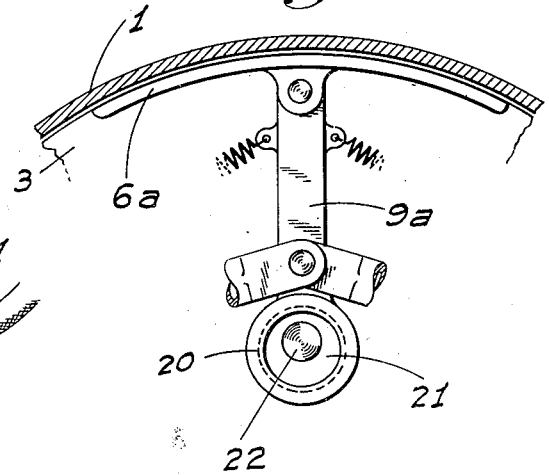
INVENTORS
J. D. Tucker and O. A. Tucker
BY
ATTORNEY Patented Sept. 6, 1932

1,876,265

UNITED STATES PATENT OFFICE

JESSE D. TUCKER AND OTTO A. TUCKER, OF SACRAMENTO, CALIFORNIA; SAID JESSE D. TUCKER ASSIGNOR TO TUCKER-GILMORE MFG. CO., OF NORTH SACRAMENTO, CALIFORNIA, A CORPORATION OF CALIFORNIA

VEHICLE BRAKE

Application filed October 3, 1930. Serial No. 486,092.

This invention relates to motor vehicle brakes of the internal expanding and hydraulic character. Our principal object is to provide a brake structure of this general nature in which the rotation of the brake drum acts, with the selective actuation of a control member, to effect an application of the brakes. A further object is to arrange the mechanism in such a way that the braking action is equally effective whether the vehicle is traveling forward or backwards.

A further object of the invention is to provide a simple and inexpensive device, and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 2 is a similar fragmentary view showing the brake as applied.

Fig. 3 is a fragmentary transverse section substantially on the line 3—3 of Fig. 1.

Fig. 4 is a fragmentary view showing a modified arrangement for controlling the initial movement of the shoe actuating member.

Figure 1:
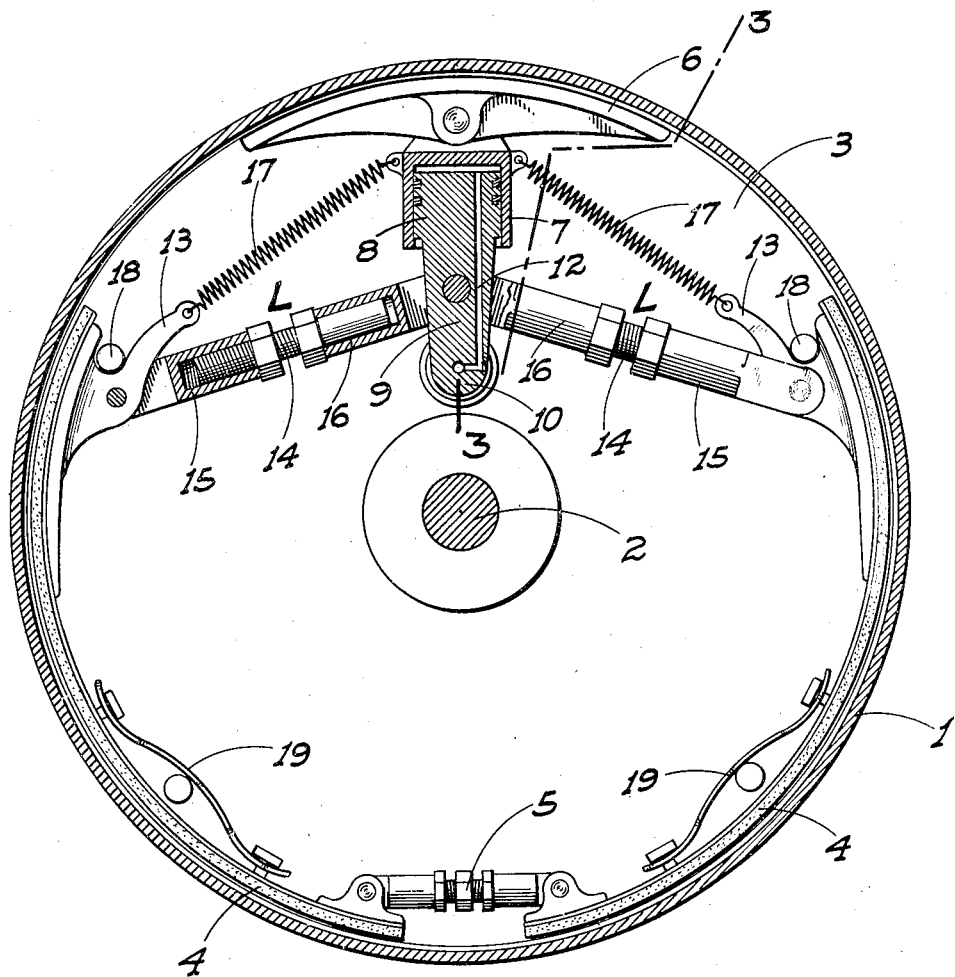
Fig. 1 is a side view of our improved brake structure with the parts in their normal or nonbraking position.

Referring now more particularly to the characters of reference on the drawings, 1 denotes a brake-drum of common construction which is fixed on a wheel of the vehicle as usual, and is therefore concentric and turns with the axle 2. This axle is turnable in a housing from which a disc 3 projects outwardly in the plane of and to the inner edge of the brake-drum, so as to form a support for the brake structure and also enclose the same. The axle housing as usual is a relatively stationary member so that the disc 3 is likewise stationary relative to the brake-drum.

The brake structure comprises a pair of curved brake shoes 4 flexibly connected together at one end by a turn-buckle 5 and separated from each other some distance at the opposite end. Positioned to engage the drum in the space between said separated ends of the shoes is another relatively short shoe 6, the radius of which is the same as that of the drum.

This shoe is swivelly connected to a cylinder 7 which is slidable on a piston 8. This piston is formed with an arm 9 rigid therewith and depending from the cylinder. This arm terminates at its outer end in a hub 10 which is disposed parallel to the axle 2 and is turnably mounted in the disc 3 in the area thereof between the axle and the shoe 6.

Outwardly of the disc the hub is connected to a flexible conduit 11 which communicates with a passage 12 drilled through the piston member to the inner end of the piston. This enables oil or other fluid to be fed to the cylinder for the purpose which will be seen later without interfering with the swivel movement of the piston unit. Short arms 13 project outwardly from the brake shoes 4 near their separated ends, and links L connect said arms to the arm 9 at a common point in the length of the latter. These links each comprise a central portion 14, one end of which is adjustably screwed into a socket 15 which is pivoted on a corresponding arm 13; and the other end is slidable in a socket 16 which is pivoted on the arm 9 or vice versa.

Counter-balancing springs 17 between the arms 13 and the cylinder act to hold the latter and the piston unit in a centrally disposed position between the brake shoes. Anchor or locating pins 18 are secured to the disc 3 and project between the brake shoes and the U-shaped openings formed between the shoes and the arms 13, said pins limiting the movement of the shoes away from the drum. Springs 19 are applied in a suitable manner to the brake shoes intermediate their ends and tend to release the same.

In operation when a fluid is fed into the cylinder, the shoe 6 is forced against the drum. The frictional engagement thus obtained causes the rotation of the drum to swing the shoe and parts connected thereto in the same direction as that in which the drum rotates. This causes the corresponding link L to force the adjacent shoe 4 into frictional or braking contact with the drum. In doing so, the adjacent arm 13 bears against its anchor pin 18 and in so doing forces the shoe 4 to move circumferentially of the brake drum somewhat. Since both shoes are floating between the anchor pins, this movement causes both shoes to engage the drum with practically equal pressure except at the anchored end of the other shoe, which is held against movement by the corresponding anchor pin. The opposite link will be lengthened somewhat owing to the sliding fit between the members 14 and 16. The corresponding end of the opposite brake shoe will therefore not tend to be pulled away from the drum and no undue strain will be placed on the anchor pins or any other part. If the drum is rotating in the opposite direction the same movement is imparted to the other brake shoe with equal effectiveness, as will be obvious.

Fig. 4 shows a mechanical means for moving the actuating shoe outwardly. In this structure the shoe 6a is swivelly connected to a rigid arm 9a. At its inner end, this arm is formed with an eccentric strap 20 which engages an eccentric 21. This eccentric is mounted on a shaft 22 journaled in and projecting through the back plate 3 so that it may be connected to an operating arm lever.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A brake structure comprising an internal drum, a brake shoe mounted for engagement with the drum, an actuating member adapted to be frictionally engaged with the drum, a cylinder associated with the member, a piston slidable in the cylinder, an arm rigid with and depending from the piston and swivelly mounted in a fixed position relative to the drum on an axis parallel to the drum axis, means for supplying a fluid to the cylinder, and a link between the arm and the shoe adjacent one end of the same.

2. A brake structure comprising an internal drum, opposed brake shoes in the drum separated from each other at adjacent ends, an actuating member positioned between said separated shoe ends for engagement with the drum, an arm associated with said member and swivelly mounted in a fixed position relative to the drum on an axis parallel to the axis of the drum, means acting to maintain the arm centrally relative to the separated shoe ends, means for moving the member into frictional engagement with the drum, and rigid links between the arm and the shoes adjacent their separated ends.

3. A structure as in claim 2, in which the links are extensible whereby when the arm swings to one side or the other relative to a normal central position, one link may extend without moving the corresponding shoe away from the drum.

In testimony whereof we affix our signatures.

JESSE D. TUCKER.
OTTO A. TUCKER.